United States Patent [19]
Yamamoto et al.

[11] 4,409,465
[45] Oct. 11, 1983

[54] PULSE ARC WELDING METHOD AND DEVICE IN WHICH PULSE CURRENT AND BACKGROUND CURRENT HAVE A CONSTANT CURRENT CHARACTERISTIC

[75] Inventors: Hideyuki Yamamoto; Waichi Nishikawa, both of Kobe; Moritoshi Nagasaka, Osaka, all of Japan

[73] Assignee: Osaka Transformer Co., Ltd., Osaka, Japan

[21] Appl. No.: 257,388

[22] Filed: Apr. 24, 1981

[51] Int. Cl.³ .............................................. B23K 9/09
[52] U.S. Cl. ........................ 219/137 PS; 219/130.51; 219/130.31
[58] Field of Search ..................... 219/137 PS, 130.51, 219/137.71, 130.33, 130.21, 130.31

[56] References Cited

U.S. PATENT DOCUMENTS

| | | | |
|---|---|---|---|
| 4,152,759 | 5/1979 | Hedberg | 363/160 |
| 4,159,409 | 6/1979 | Hedberg | 219/130.21 |
| 4,300,035 | 11/1981 | Johansson | 219/130.21 |
| 4,319,124 | 3/1982 | Johansson | 219/130.51 |

Primary Examiner—C. C. Shaw
Attorney, Agent, or Firm—Antonelli, Terry & Wands

[57] ABSTRACT

A pulse arc welding device includes a power source which produces a background current and pulse current imposed on it. A voltage drop across the arc is measured and when such a voltage drop deviates from a predetermined level, either one of background current, frequency of the pulse current and pulse duration of the pulse current is controlled to maintain the voltage drop across the arc constant.

17 Claims, 17 Drawing Figures

PULSE ARC WELDING METHOD AND DEVICE IN WHICH PULSE CURRENT AND BACKGROUND CURRENT HAVE A CONSTANT CURRENT CHARACTERISTIC

The present invention relates to a pulse arc welding method and device, in which a consumable electrode is supplied at a constant speed.

Generally, in the pulse arc welding method, a consumable electrode fed at a constant speed has its forward end portion facing a workpiece being fused and separated to produce droplets (small size drops) which are transferred to the workpiece in a manner of spray transfer. In order to carry out a uniform welding with stable arc and with no spatter, it is necessary to maintain the arc length constant. The consumable electrode is supplied with a low level background current below a critical current level capable of spray transporting and a train of pulse current imposed on the background current and having a level above the critical current level. The spray transfer of the consumable electrode is carried out only when the pulse is applied. Furthermore, the arc length is maintained constant, during the constant forward movement of the consumable electrode, by a self-regulating system of a power supplying device that operates relatively with respect to the fluctuation of the arc length. For this purpose, the power supplying device according to the prior art includes a background current supplying source (hereinafter referred to as a background source) and a pulse current supplying source (hereinafter referred to as a pulse source) in which either one of the background source and pulse source has a constant voltage characteristic. More particularly, the pulse arc welder according to the prior art for carrying out the welding with a constant wire-feed system is either of a first type in which the background source has a constant voltage characteristic and the pulse source has a constant current characteristic, or drooping characteristic, with a small inclination, or a second type in which the background source has a constant current characteristic and the pulse source has a constant voltage characteristic. These characteristics of the first and second types are shown in the graphs of FIGS. 2 and 3, respectively, relatively with arc characteristic. Before analyzing the graphs, the reference characters used herein are explained below with reference to FIG. 1.

Ib: An instantaneous current level of the welding current during the supply of background current. This is referred to as a background current level.

Ip: An instantaneous current level of the welding current during the supply of pulse current. This is referred to as a pulse current level.

Tb: A period of background current measured between two neighboring pulses. This is referred to as a background current period.

Tp: A pulse duration.

T: One cycle period. T=Tb+Tp.

f: Pulse frequency. f=1/T. Welding current=background current+pulse current

Iba: An average value of the background current.

$$Iba = 1/T \int_0^{Tb} Ib\,dt = Ib \cdot Tb/T$$

Ipa: An average value of the pulse current.

$$Ipa = 1/T \int_0^{Tp} Ip\,dt = Ip \cdot Tp/T$$

Ia: An average value of the welding current.

$$Ia = (Ib \cdot Tb + Ip \cdot Tp)/T = Iba + Ipa.$$

Vb: An instantaneous voltage level of the arc voltage during the presence of background current. This is referred to as a background voltage level.

Vp: An instantaneous voltage level of the arc voltage during the presence of pulse current. This is referred to as a pulse voltage level.

Vba: An average value of the background voltage.

$$Vba = 1/T \int_0^{Tb} Vb \cdot dt = Vb \cdot Tb/T$$

Vpa: An average value of the pulse voltage.

$$Vpa = 1/T \int_0^{Tp} Vp \cdot dt = Vp \cdot Tp/T$$

Va: An average value of the arc voltage.

$$Va = (Vb \cdot Tb + Vp \cdot Tp)/T = Vba + Vpa$$

In the graph of FIG. 2, abscissa and ordinate represent current I and voltage V, respectively, and a real line B-CP indicates the constant voltage characteristic of the background source and a dotted curve P-CC indicates the constant current characteristic (drooping characteristic) of the pulse source. Furthermore, chain lines L0, L1 and L2 indicate arc characteristic of different arc length. The graph of FIG. 2 represents the above described first type arc welder which has, as understood from the graph, such an advantageous feature that spray transfer can be carried out stably because the pulse current level Ip is maintained stable regardless of change of arc length, e.g., from L0 to L1, or to L2, caused by irregular surface of the workpiece or unexpected shaking of the arc welder. The fluctuation in the arc length, however, adversely affects the arc voltage average value Va such that, as the arc length becomes longer, e.g., from L2 to L0 and further to L1, the acting point on the line B-CP shifts towards lower region of the current I, and therefore, the arc voltage average value Va gradually increases from Va2 to Va1, that is, to a region accessible to no-load voltage Vbo, resulting in unstableness of the arc. Such an unstableness is particularly serious when the arc welder is adjusted with low background current level to produce low no-load voltage Vbo.

Similarly, in the graph of FIG. 3, abscissa and ordinate represent current I and voltage V, respectively. In this graph, a real line B-CC indicates constant current characteristic of the background source and dotted line P-CP indicates constant voltage characteristic of the pulse source. The graph of FIG. 3 represents the above described second type arc welder which has, as understood from the graph, such an advantage that the welding arc is maintained stable regardless of fluctuation of arc length even if the background current level is fixed to a considerably low level since the background source has the drooping characteristic. However, there is such a disadvantage that the pulse current level greatly changes with respect to the fluctuation of the arc length, e.g., from L0 to L1, or to L2, resulting in change in the size of the molten drops released from the electrode. Such a change in the size often results in, particularly when the pulse current level is reduced, a globular (large size drop) transfer of fused electrode that intercepts the smooth welding process of spray transfer.

Accordingly, it is a primary object of the present invention to provide an improved method of carrying out the pulse arc welding which can eliminate above described disadvantages.

More particularly, the arc welding method according to the present invention allows one to carry out the smooth welding of spray transfer regardless of fluctuation in the arc length and to produce a stable constant arc from the consumable electrode which is being fed at a constant speed.

In order to accomplish the above object, the arc welding method according to the present invention comprises the steps of unifying the pulse current level to a predetermined level, setting the background source with the constant current characteristic, and comparing the detected arc voltage level with a predetermined level, thereby maintaining the arc voltage constant by changing arc length.

It is a further object of the present invention to provide an improved pulse arc welding device which is so arranged as to carry out the pulse arc welding method of the present invention.

In accomplishing these and other objects, a pulse arc welding device for welding a workpiece by an arc produced between a consumable electrode which is fed towards the workpiece at a constant speed and the workpiece comprises means for generating a background current, means for generating a pulse current, means for imposing the pulse current on the background current, means for detecting the welding voltage measured between the consumable electrode and the workpiece for producing a welding voltage signal, means for producing a reference signal indicative of a desired welding voltage, and means for comparing the welding voltage signal with the reference signal for producing a difference signal indicative of the difference therebetween. The pulse arc welding device further comprises means for controlling one of the background current level Ib, the duration Tp of the pulse current and the pulse current frequency (f=1/T) by the difference signal such that one of said Ib, Tp and f is decreased in response to the increase of the welding voltage signal above a predetermined level, and one of said Ib, Tp and f is increased relative to the decrease of said welding voltage signal below the predetermined level, whereby the welding voltage which is in relation to the arc length is maintained constant.

These and other objects and features of the present invention will become apparent from the following description taken in conjunction with preferred embodiments thereof with reference to the accompanying drawings, throughout which like parts are designated by like reference numerals and characters, and in which.

When carrying out the pulse arc welding, the factors in the pulse current that influences the continuous spray transfer are pulse current level Ip, pulse duration Tp and pulse frequency f. Although these three factors influence, together with the background current, degree of heating and fusion of the forwarding end portion of the consumable electrode, the most important factor for separating the fused electrode is the pulse current level Ip which produces a force proportional to $IP^2$ by a socalled pinch effect. Therefore, when the pulse current level Ip increases to a high level, the fused electrode can be separated into droplets (very small particles) which are spray transferred constantly to the workpiece, thus carrying out an optimum welding process. On the contrary, when the pulse current level Ip decreases to a low level, the fused electrode is separated by globulars (large drops) which are intermittently deposited along the workpiece. Therefore, it is necessary to prevent the pulse current level Ip from being dropped below a predetermined level, and preferably the pulse current level Ip should be maintained at a desired level.

Figure 4:
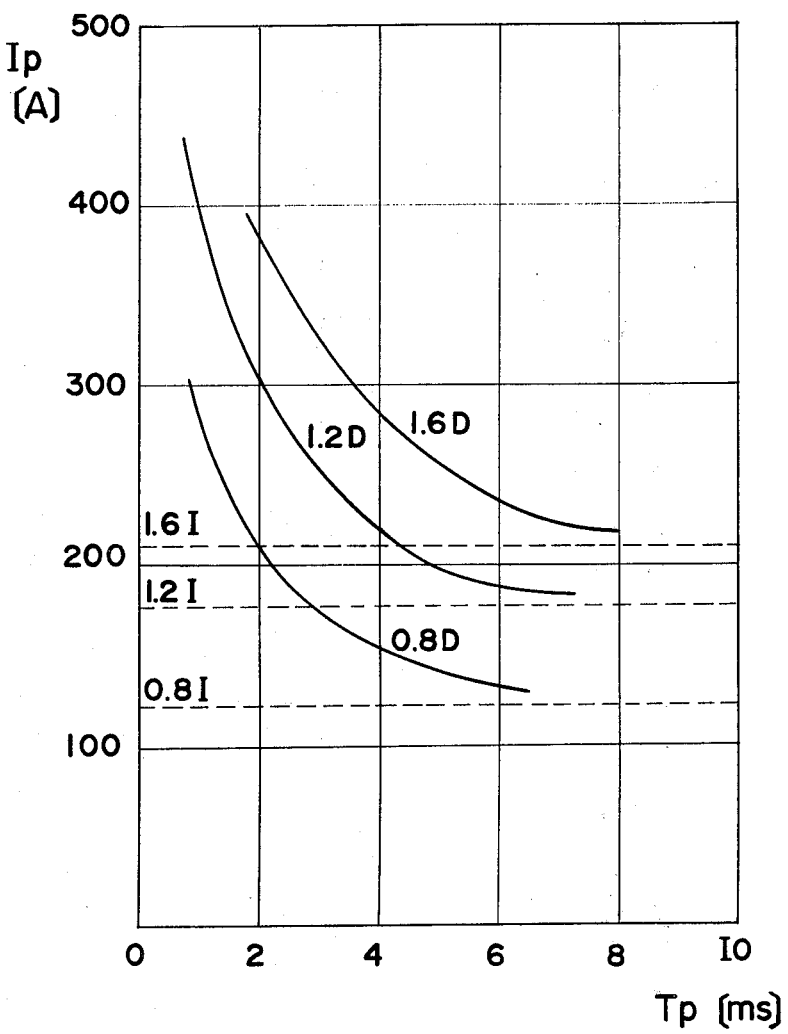
FIG. 4 is a graph showing a relation between pulse duration and pulse current for producing an arc.

Although the separation of the fused electrode is controlled by the pinch force effected by the pulse current level Ip, the separation of the fused electrode is also relative to the pulse duration Tp. Therefore, the condition in which the fused electrode is separated is determined by the pulse current level Ip and pulse duration Tp, and examples of such a condition are shown in graph of FIG. 4 in which abscissa and ordinate represent pulse duration Tp (ms) and pulse current level Ip(A). In the graph of FIG. 4, a curve indicated by a numeral 1.6D, shows a border line of a region in which the spray transfer can be carried out using 1.6 mm diameter stainless steel as the consumable electrode in 2% $O_2+Ar$ inert-gas. In this case, the pulse arc welding with spray transfer can be carried out in a region above the curve 1.6D. Similarly, curves 1.2D and 0.8D show border lines of such a region using 1.2 mm diameter stainless steel and 0.8 mm diameter stainless steel, respectively, as the consumable electrode in 2% $O_2$+Ar inert-gas. Should the pulse arc welding be carried out in a region under these curves, the fused electrode will be transferred to the workpiece in drops. Dotted lines 1.6I, 1.2I and 0.8I show critical current level for the stainless steel consumable electrodes of 1.6 mm, 1.2 mm and 0.8 mm diameters, respectively. These critical current levels show the minimum available average welding current level for carrying out the spray transfer. Therefore, in order to proceed the spray transfer with a short pulse duration, for example, 5 ms or less, $Ip^2 \cdot Tp$ must have a certain value determined by the diameter of the consumable electrode. In other words, in the region with short pulse duration Tp, e.g., below 5 ms, the condition in which the spray transfer can be carried out is determined both by the parameters Tb and Ip, but in the region with long pulse duration Tp, such a condition is determined solely by the pulse current level Ip. In the region with long pulse duration Tp, the parameter of the pulse duration Tp affects, together with the parameter of background current, the heating and fusion of the end of the consumable electrode.

Although the transfer of the fused electrode is carried out during the supply of pulse current, such a transfer will not be carried out properly unless the end of the consumable electrode is heated and fused. This implies that the increase of the pulse frequency f increases the pulse current, and which accordingly expedites, together with the background current, the heating and fusion of the electrode. It is to be noted, however, that the increase of the pulse frequency f does not necessarily mean that such an increase directly expedites the transfer of the fused electrode. Therefore, it can be said that the pulse frequency f will not directly effect the separation of the fused electrode, as in a manner effected by the above described value $Ip^2 \cdot Tp$.

As understood from the above analysis, whether the spray transfer can be carried out properly or not is mainly determined by the pulse current level Ip which controls the separation of the fused electrode. Therefore, it is necessary to maintain the pulse current level Ip approximately equal to a predetermined level. The arc length is controlled by the melting rate of the electrode, and such a melting rate is determined by the pulse frequency f, pulse duration Tp and welding current average value $Ia=(Ib \cdot Tb+Ip \cdot Tp)/T$ which contains the former two factors $f=1/T$ and Tp. Although the welding current average value Ia is determined by the parameters of background current level Ib, background current period Tb, pulse current level Ip and pulse duration Tp, the pulse current level Ip must be maintained to a predetermined level as explained above, and therefore, it can not be varied for the control of the welding current average value Ia. Furthermore, since the background current period Tb is determined by the period (T−Tp), it can not be varied independently. Moreover, although it is possible to theoretically vary the background current level Ib to control the welding current average value Ia, it is not always appropriate from the practical point such that, in general a pulse arc welder with the background source employing a feedback circuit to make it operable with constant current characteristic, and accordingly producing a constant background current Ib, has such advantages that its control is very simple and it does not require any additional power source for its control, and from this point of view, the rearrangement of the background source to allow the change in background current level Ib can be realized only when these advantages are deserted. As to the pulse duration Tp, this can be used to control the welding current average value Ia with a limitation that the pulse duration Tp is not in the region in which the pulse duration Tp affects the determination of border line of the spray transfer described above in connection with FIG. 4, i.e., with a limitation that the pulse duration Tp is greater than, according to the example of FIG. 4, about 6 ms. Accordingly, it can be concluded that the parameters which can be used for controlling the welding current average value Ia are one cycle period T which can be evaluated by pulse frequency f and is the most convenient parameter, pulse duration Tp which comes next, and background current level Ib.

Figure 1:
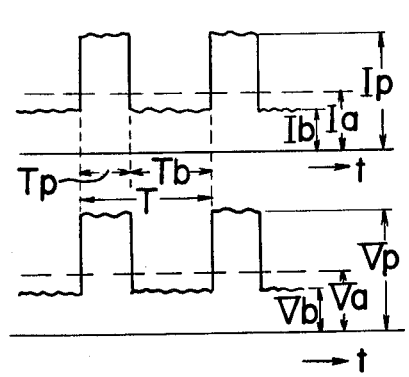
FIG. 1 is a graph showing welding parameters used in the description.
Figure 2:
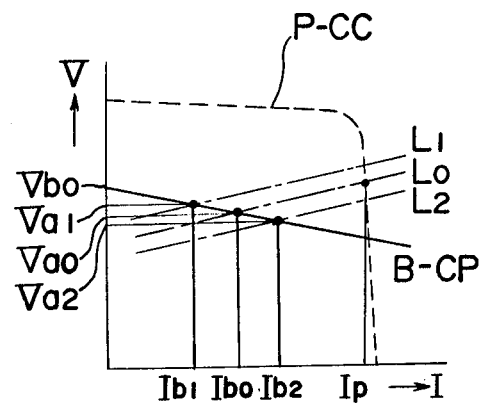
FIGS. 2 and 3 are graphs showing relationship between welding current and welding voltage of welding devices of the prior art.
Figure 3:
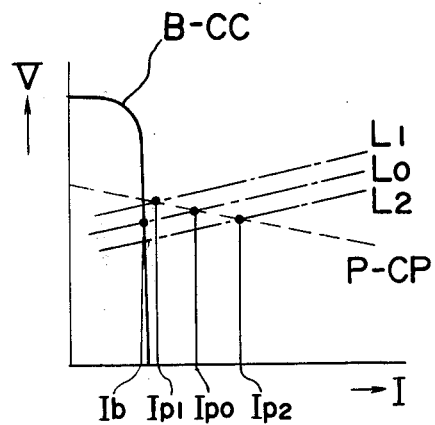
Figure 5:
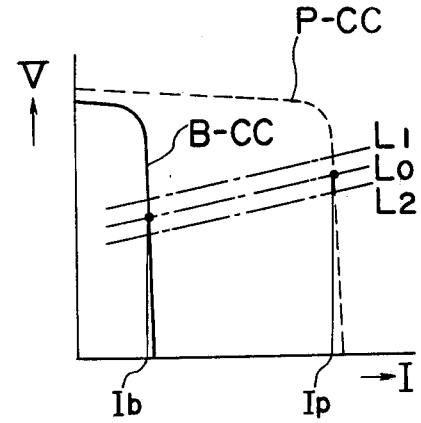
FIG. 5 is a graph showing relationship between welding current and welding voltage according to the present invention.

Referring to FIG. 5, a graph depicted therein shows output characteristics of the background source and pulse source and arc characteristic of a pulse arc welding device according to the present invention. In the graph, abscissa and ordinate represent, respectively, current and voltage, and in which graph a dotted line P-CC indicates constant current characteristic of the pulse source and is similar to that shown in FIG. 2. This constant current characteristic can be obtained by the use of a feedback circuit which controls the pulse current level Ip by a signal indicative of a difference between a predetermined reference level and the feedback pulse, current level Ip, or its average value Ipa.

As to the background source, it is necessary to set the no-load voltage of the background source to a considerably high level to prevent the arc from being produced intermittently, and for this purpose, the background source has a constant current characteristic as shown in FIG. 5 by a real line B-CC. However, when the background source is arranged to have constant current characteristic, the self-regulating effect of the arc by the source becomes less effective, and accordingly, it is necessary to provide a means to detect the arc length and to control the arc length approximately equal to a predetermined length. The control of the arc length can be carried out by the control of fusing speed of the constantly fed consumable electrode, and such a fusing speed can be controlled by the change of the welding current average value. The manner in which the arc length is controlled is described in detail below.

When the arc length deviates from a desired length, a voltage drop between the consumable electrode and the workpiece, hereinafter referred to as an arc voltage level, is detected and compared with a reference voltage. When the arc voltage level becomes greater than the reference voltage, i.e., when the arc length becomes longer than the desired length, the welding current average value Ia is decreased by the decrease of any one or a combination of the parameters of pulse frequency f, pulse duration Tp and background current level Ib. The decrease of welding current average value Ia results in decrease of the arc length, and as a consequence, the arc length is again set to the desired length. A similar procedure is taken when the arc voltage level becomes smaller than the reference voltage.

It is to be noted that the above described arc voltage level can be detected relatively by the background voltage average value Vba or arc voltage average value Va. However, in the case where the pulse duration Tp is considerably long and pulse current level Ip is considerably high to produce a considerably high arc voltage Vp, the arc voltage level should preferably be detected relatively by the pulse voltage average value Vpa for allowing more precise detection than when the above value Vba or Va is used.

It is also to be noted that the arc voltage can be detected relatively by the background voltage level Vb sampled during the background current period Tb, or by the pulse voltage level Vp sampled during the pulse duration Tp.

As described above, since the pulse current level Ip can be maintained approximately equal to a predetermined level, the separation of the fused electrode can be carried out uniformly, and at the same time, the weld penetration can be effected with uniform depth, and therefore, a desirable penetration welding can be carried out. Furthermore, since the background source has a constant current, or drooping, characteristic, the arc will not be interrupted even if the background current level is fixed to a low level, and therefore, a stable arc can be maintained during the operation. The above described method according to the present invention can be applied to a low current welder for welding thin plates or to a high speed welder without producing spatters such as short-circuiting transfer.

Figure 6:
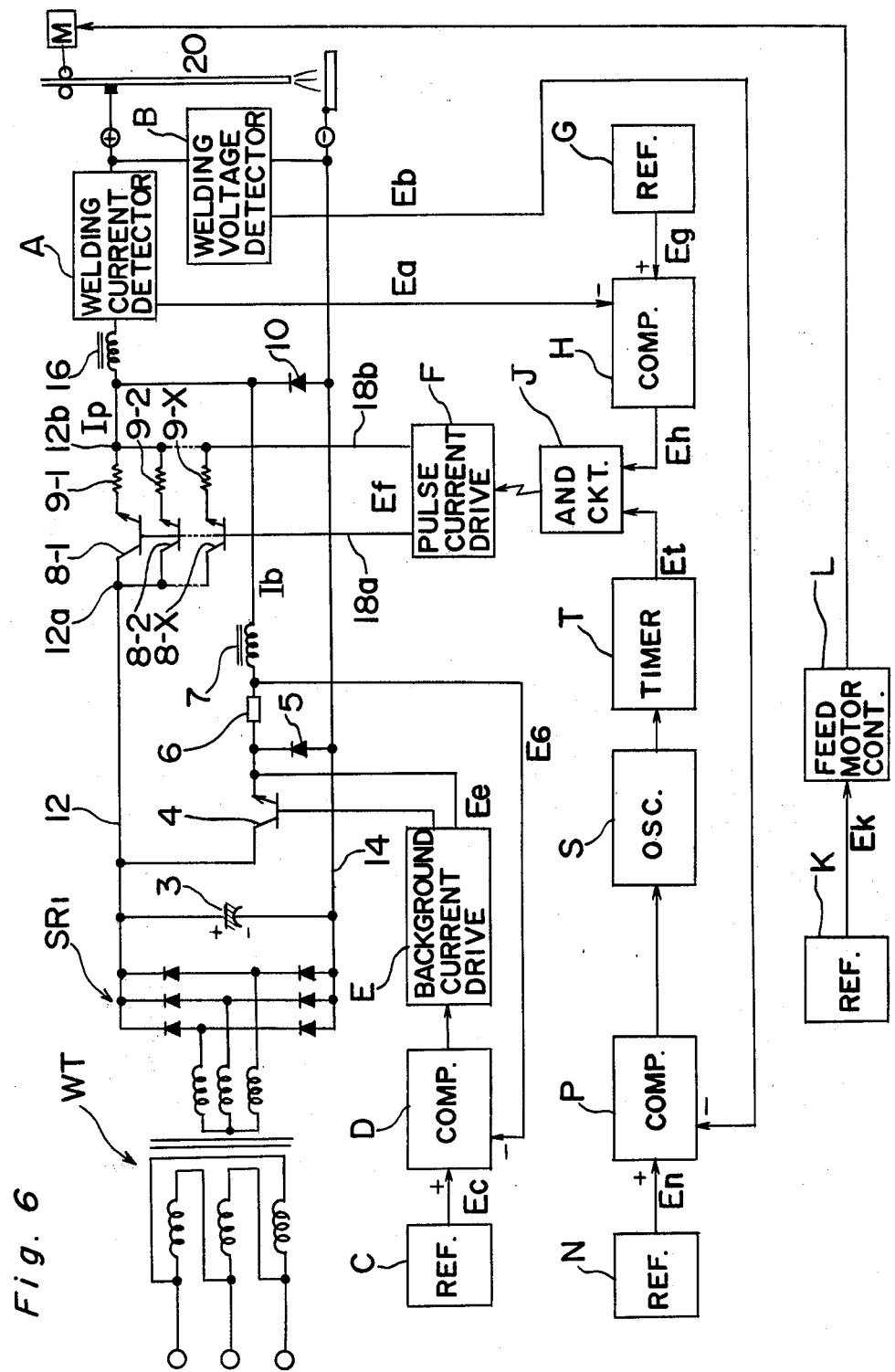
FIG. 6 is a block diagram of a pulse arc welding device according to the first embodiment of the present invention.

Referring to FIG. 6, there is shown a pulse arc welding device according to the first embodiment of the present invention. The welding device of the first embodiment is so arranged as to control the arc voltage, which is approximately proportional to the arc length and thus arc length, constant by way of control of the pulse frequency. The welding device shown comprises a source of DC power, a background current generator, a pulse current generator, a consumable electrode feeding control and a welding power control which is, according to the first embodiment, formed by a pulse frequency control. Each of these components is described in detail below.

The source of DC power includes a three-phase transformer WT for receiving three-phase AC power, a group of rectifiers SR1 coupled to the three-phase transformer WT and a capacitor 3 connected between lines 12 and 14 from which the DC power is produced.

The background current generator includes switching transistor 4, shunt resistor 6 and inductor 7 which are connected in series between the line 12 and an anode of a flywheel diode 10 which is to be included in the pulse current generator. The background current generator further includes a reference voltage setting circuit C for producing a reference voltage Ec indicative of a desired voltage to be produced from the shunt resistor 6, a comparator D for comparing the voltage difference between the reference voltage Ec obtained from the reference circuit c and the voltage E6 obtained from the shunt resistor 6 and for producing a signal indicative of the difference, and a background current drive circuit E which, upon receipt of the difference signal, produces a drive signal Ee that controls the on and off states of the transistor 4. It is to be noted that the background current drive circuit E forms a chopper circuit together with the transistor 4. A suitable flywheel diode 5 is connected between the line 14 and the emitter of the transistor 4. The detail of the reference circuit C, comparator D and background current drive circuit E is described below in connection with FIG. 7.

Figure 7:
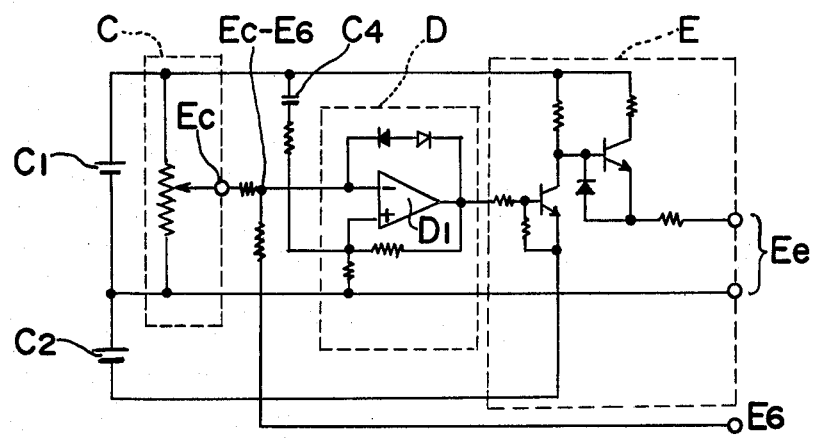
FIG. 7 is a circuit diagram of blocks C, D and E shown in FIG. 6.

In FIG. 7, the comparator D includes an operational amplifier D1, e.g., 741C, which is so arranged as to operate according to a so-called hysteresis characteristic wherein an input voltage eA for turning the comparator from inoperative to operative is higher than an input voltage eB for turning the same from operative to inoperative. More particularly, when the voltage difference between the voltage Ec obtained from the reference circuit C and the voltage E6 obtained from the shunt resistor 6, i.e., Ec-E6, reaches, during its increase, a predetermined voltage eA, the comparator D becomes operative to produce a high level signal which is applied to the background current drive circuit E which in turn produces a high level signal Ee to turn the switching transistor 4 on. The current that flows through the transistor 4 then increases exponentially as the inductor 7 accumulates energy. This exponentially increasing current is fedback to the comparator D, and accordingly, the voltage difference Ec-E6 gradually decreases. When the voltage difference Ec-E6 reaches a predetermined voltage eB, the comparator D is turned from operative to inoperative to produce a low level signal. Accordingly, the background current drive circuit E produces a low level signal for turning the transistor off. Thereupon, the energy accumulated in the inductor 7 is dissipated through the flywheel diode 5, and accordingly, the current flowing through the shunt resistor 6 decreases. Then, the voltage Ec-E6 increases and when it reaches the predetermined voltage eA, the comparator D operates to turn the transistor 4 on. The above described operation is repeated again and again to produce a constant current having the background current level Ib from the inductor 7. In FIG. 7, a DC voltage source C2 is provided for applying a reverse bias voltage to a transistor to speed up the on and off response of the transistor. Furthermore, a contactor C4 is provided for controlling the on and off of the background current generator such that when the contactor C4 closes, the comparator D is turned off to maintain the background current generator in off state. According to a preferred embodiment, the frequency of on and off should be between several 100 Hz and several 10 KHz.

It is to be noted that the background current generator described above is a chopper type in which the switching transistor 4 chops the current. Instead of chopper type, it is possible to employ any other type, such as a thyristor type or a resistor type, so long as the background current generator supplies a stable constant current.

Referring to FIG. 6, the pulse current generator includes a plurality of transistors 8-1, 8-2, . . . and 8-x which are respectively coupled with resistors 9-1, 9-2, . . . and 9-x provided for balancing the current flowing through the corresponding transistors. These transistors 8-1 to 8-x coupled with resistors are connected parallel to each other and are inserted in the line 12 so that collectors of the transistors 8-1 to 8-x are connected to a junction 12a and emitters of the same are connected through the respective resistors to a junction 12b which is in turn connected through an inductor 16 to a welding current detector A. The bases of the transistors 8-1 to 8-x are connected through a line 18a to a pulse current drive circuit F and the junction 12b is connected through a line 18b to the pulse current drive circuit F. As will be described in detail later, the pulse current drive circuit F produces a train of pulses Ef between the lines 18a and 18b. The pulse current generator further includes a comparator H which compares a signal Ea indicative of the welding current obtained from the welding current detector A and a reference signal Eg obtained from a reference signal setting circuit G. A difference signal Eg-Ea produced from the comparator H is applied to an AND circuit J which is coupled with a pulse current drive circuit F preferably through an optoisolator. As apparent to those skilled in the art, the pulse current generator also employs the chopper method for controlling the pulse current.

Figure 8:
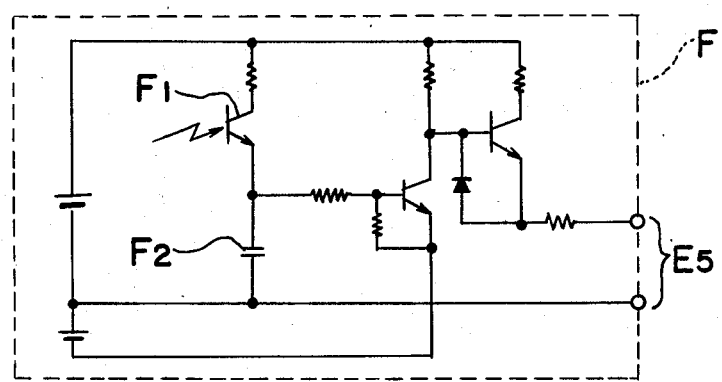
FIG. 8 is a circuit diagram of block F shown in FIG. 6.

Referring to FIG. 8, there is shown a detail of the pulse current drive circuit F which includes a phototransistor F1 arranged to receive light signal emitted from the AND circuit J and a contactor F2 which controls the on and off of the pulse current such that when the contactor F2 is closed, the pulse current generator produces no pulse current. The pulse current drive circuit F also includes transistors which are arranged in a similar manner to those provided in the background current drive circuit E.

Figure 9:
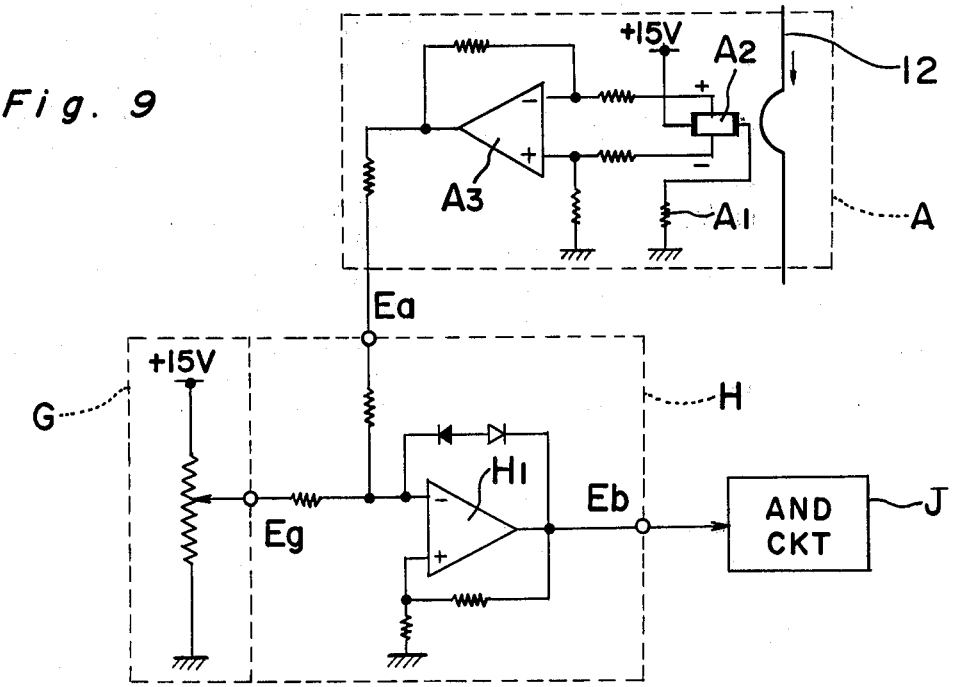
FIG. 9 is a circuit diagram of blocks A, G and H shown in FIG. 6.

Referring to FIG. 9, there is shown a detail of the welding current detector A, comparator H and reference circuit G. The welding current detector A includes a Hall element A2 which is located adjacent to the line 12 extending between the inductor 16 and a consumable electrode 20 for detecting the electromagnetic effect produced from the line 12 and thus detecting the welding current level flowing through the line 12. A resistor A1 is provided for supplying a constant current to the Hall element A2. A voltage signal produced across the Hall element A2 is amplified by an amplifier A3 which accordingly produces a voltage signal Ea indicative of the welding current flowing through the line 12. The reference setting circuit G and the comparator H are arranged in a manner similar to the reference setting circuit C and comparator D described above. An amplifier H1 provided in the comparator H produces a voltage signal Eh which is indicative of voltage difference between the voltage Ea obtained from the welding current detector A and voltage Eg obtained from the reference setting circuit G, i.e. Eg-Ea. Thus obtained difference voltage Eh is applied, together with a voltage signal obtained from the pulse frequency control described later, to the AND circuit J.

Figure 10:
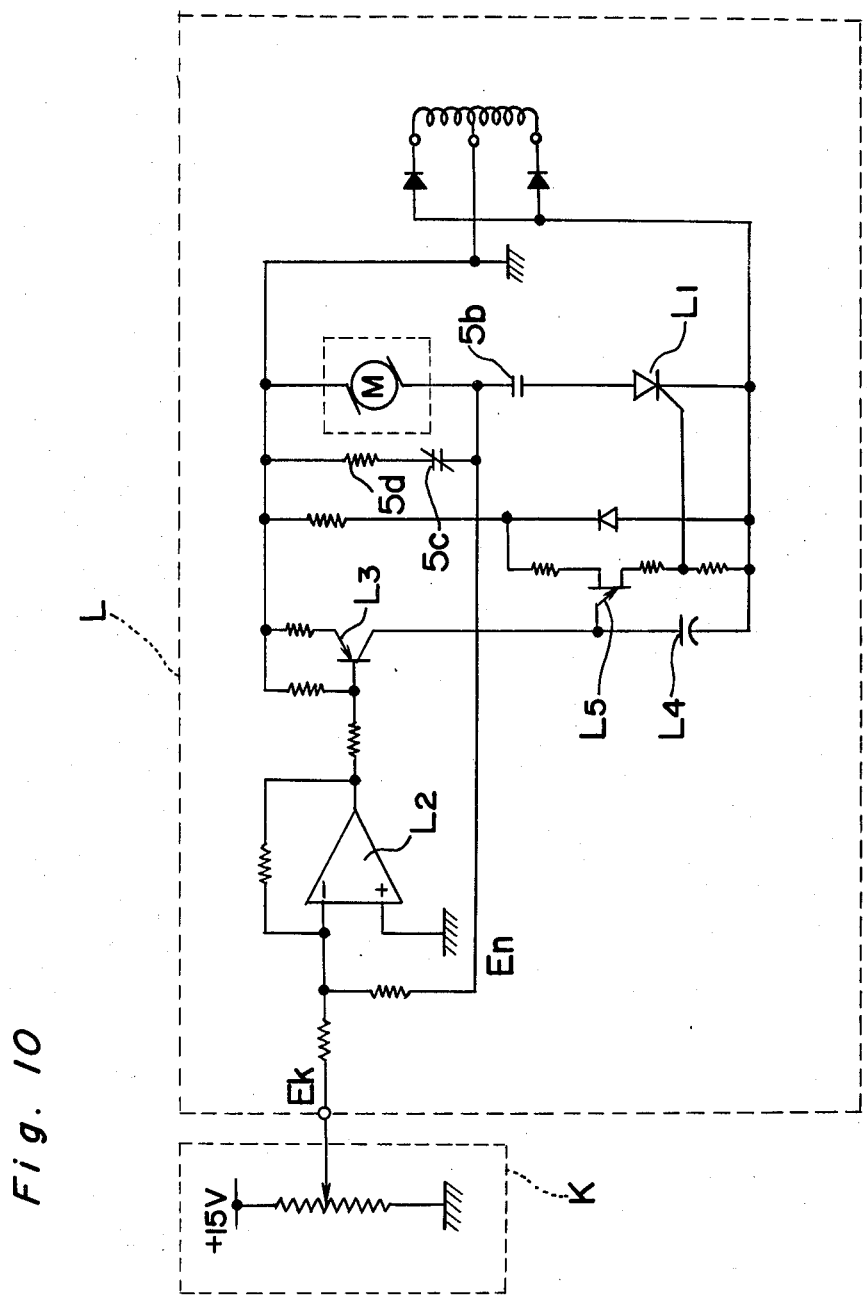
FIG. 10 is a circuit diagram of blocks K and L shown in FIG. 6.

Referring to FIGS. 6 and 10, the consumable electrode feeding control includes a motor M which is provided in association with a feed roller that feeds the consumable electrode 20. The motor M is controlled by a feed motor control L which includes, as shown in FIG. 10, a thyristor L1, a unijunction transistor L5, capacitor L4, transistor L3 for controlling the current charging the capacitor L4, and amplifier L2. The amplifier L2 produces a signal indicative of voltage difference between a voltage Em which is being supplied to the motor M and a voltage Ek obtained from a reference setting circuit K, i.e., Ek-Em. Such a voltage difference Ek-Em is applied to the transistor L3 so as to control the current flow through the transistor L3. By a time constant mainly determined by the capacitor L4 and transistor L3, the unijunction transistor L5 produces a train of pulses with a phase relative to the above described voltage difference Ek-Em. The pulses produced from the unijunction transistor L5 is used for triggering the thyristor L1 for controlling the power to be supplied to the motor M. As understood to those skilled in the art, the speed of the motor M is determined by the reference voltage Ek produced from the reference voltage producing circuit K. In other words, so long as the reference voltage Ek is maintained constant, the motor speed is maintained constant.

Referring back to FIG. 6, the pulse frequency control includes a welding voltage detector B for producing a voltage signal Eb indicative of voltage across the arc (since the voltage across the arc is relative to the arc length, the voltage signal Eb can be considered as being indicative of the arc length), a reference setting circuit N for producing a reference voltage En, a comparator P for comparing the welding voltage signal Eb with the reference voltage En, an oscillator S and a timer circuit T. The detail of these circuits B, N, P, S and T is described in detail below.

Figure 11:
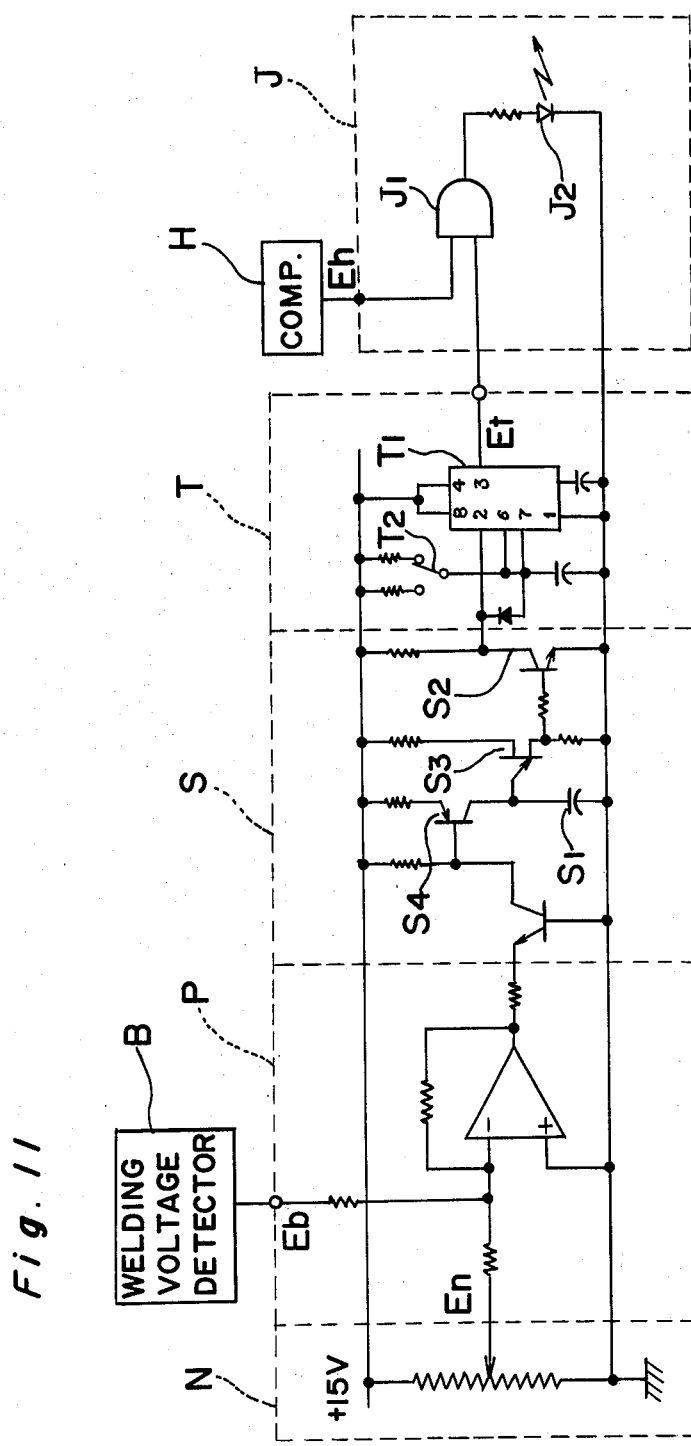
FIG. 11 is a circuit diagram of blocks N, P, S, T and J shown in FIG. 6.
Figure 12:
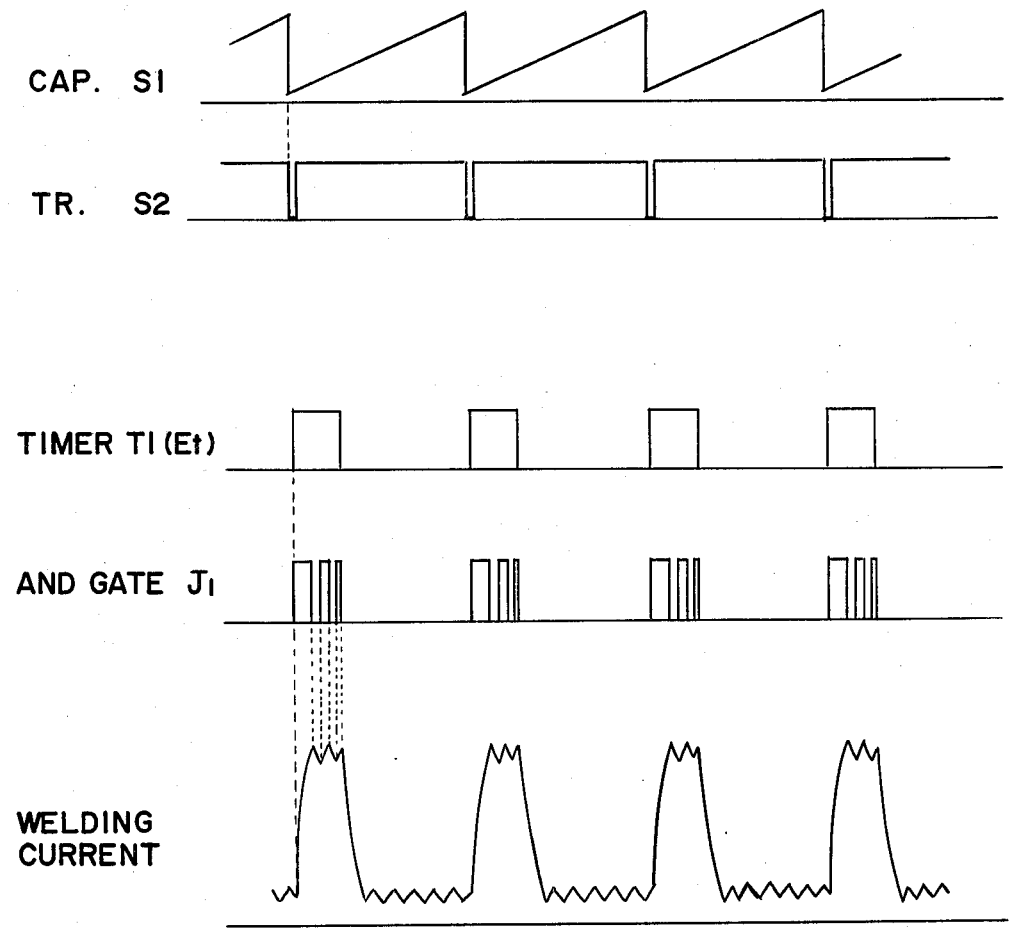
FIG. 12 is a graph showing waveforms obtained from major points in the circuit of FIG. 11.

Referring to FIG. 11, the reference setting circuit N and the comparator P have the structure similar to those circuits C and D described above in connection with FIG. 7. The reference voltage En produced from the reference setting circuit N is compared with the welding voltage signal Eb in the comparator P, and the difference therebetween En-Eb is amplified, and in turn, applied to the oscillator S including transistor S4, capacitor S1, unijunction transistor S3 and transistor S2. The transistor S4 produces a current relative to the voltage difference En-Eb obtained from the comparator P, and the capacitor S1 is charged by the current determined by the transistor S4. When the charged voltage in the capacitor S1 reaches a predetermined level, the unijunction transistor S3 is actuated to discharge the capacitor S1, and at the same time, produces a pulse to the transistor S2. Accordingly, the signal produced from the capacitor S1 has a sawtooth waveform as shown in the first row of FIG. 12, and the signal produced from the unijunction transistor S3 has a rectangular pulse waveform as shown in the second row of FIG. 12. The pulse signal produced from the unijunction transistor S3 is applied to the timer circuit T which includes a counter T1, e.g., $\mu$A 555. The timer circuit T produces a train of pulses Et, as shown in FIG. 12, having a predetermined pulse duration and a frequency identical to the frequency of pulses produced from the oscillator S. The pulse signal Et produced from the timer circuit is applied, together with the signal Eh obtained from the comparator H, to the AND circuit J. A switch T2 provided in the timer circuit T is provided for setting a desired pulse duration determined relatively to the diameter of the consumable electrode 20.

The AND circuit J includes an AND gate J1 and a light emitting diode J2. The pulse produced from the AND gate J1, as shown in FIG. 12, is changed to light signal by the light emitting diode J2 for actuating the pulse current drive circuit F. Accordingly, the welding current applied to the consumable electrode 20 will be as shown by waveform in the last row of FIG. 12.

Figure 13:
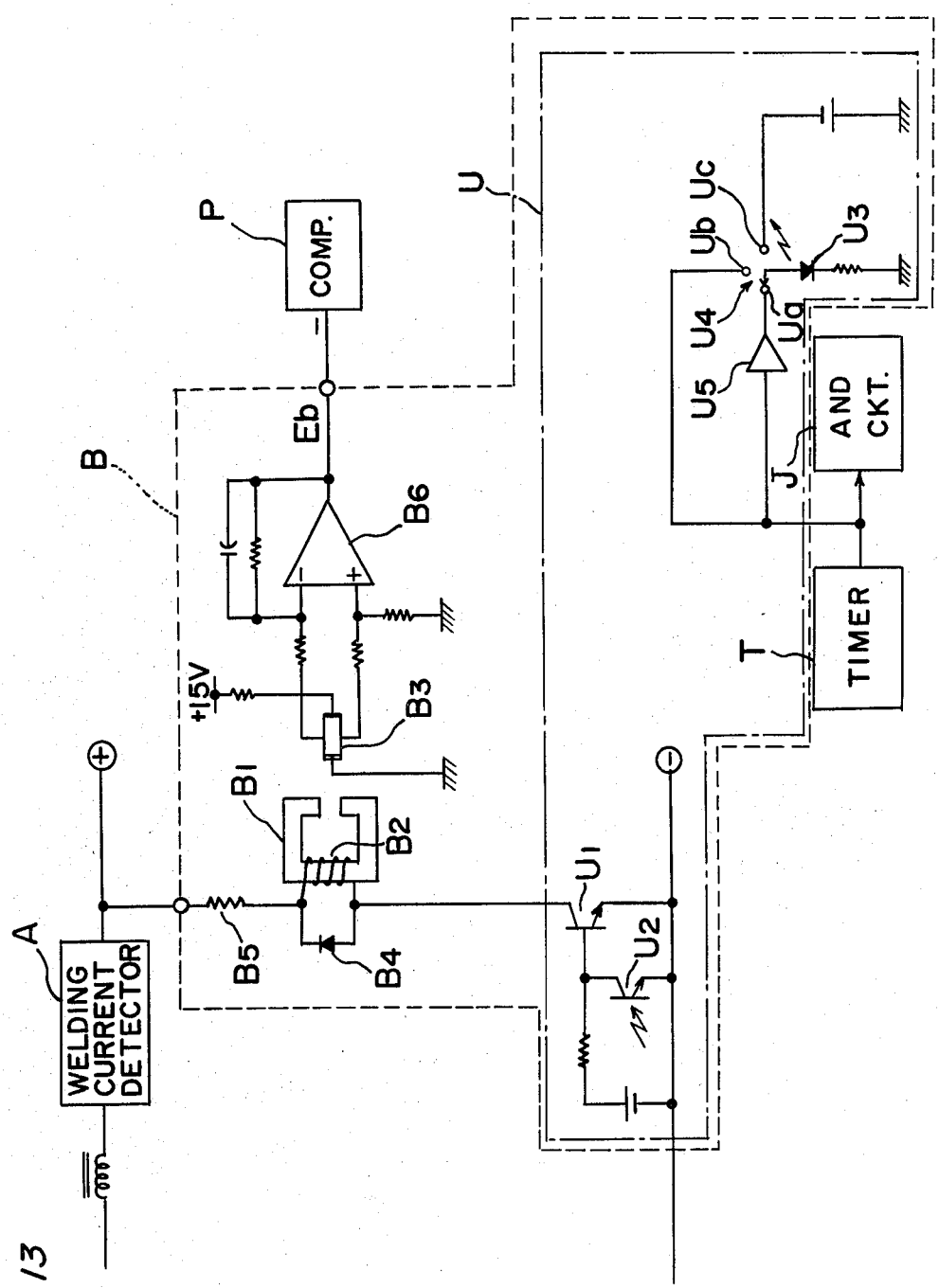
FIG. 13 is a circuit diagram of block B shown in FIG. 6.

Referring to FIG. 13, the welding voltage detector B includes a detecting period control circuit U, and a resistor B5 and a diode B4 connected in series between the consumable electrode 20 and workpiece. The diode B4 is connected in parallel with a coil B2 wound on a core B1. Accordingly, the core B1 formed in a shape of "C" generates a magnetic field which is in relation to the welding voltage. A Hall element B3 is provided adjacent to the core B1 to detect the generated magnetic field and an amplifier B6 is coupled to the Hall element B3 for producing a voltage signal Eb indicative of the welding voltage.

The detecting period control circuit U includes a transistor U1 inserted between the diode B4 and the workpiece, a photo-transistor U2 connected between the base of the transistor U1 and the workpiece, a light emitting diode U3 coupled to the photo-transistor U2, a switch U4 which selectively connects the cathode of the light emitting diode U3 to one of terminals Ua, Ub and Uc, and an inverter U5 connected between the timer circuit T and the terminal Ua. The terminal Ub is directly connected to the timer circuit T, and the terminal Uc is connected to a DC source. When the switch U4 is connected to the terminal Ua as shown, the pulse produced from the timer circuit T is inverted so that high level signal is produced from the inverter U5 when no pulse is present. Such a high level signal generates the light emitting diode U3 to emit light, and accordingly, the light receiving transistor U2 conducts so as to conduct the transistor U1. Accordingly, when the switch U4 is turned to the position as shown, the detecting period control circuit U detects the period during the absence of pulse, thus the welding voltage detector B detects the background voltage Vb. On the other hand, when the switch U4 is connected to the terminal Ub, the welding voltage detector B detects the pulse voltage Vp, and when the switch U4 is connected to the terminal Uc, the welding voltage detector B detects the average voltage Va.

In operation, when the arc length becomes greater than a predetermined length, the voltage Eb produced from the welding voltage detector B increases, and accordingly, the voltage En-Eb produced from the comparator P decreases. Thus, in the oscillator S, the current for charging the capacitor S1 decreases to speed down the actuation of the unijunction transistor S3. Accordingly, the frequency of the pulses produced from the transistor S2 is decreased, and thus, the frequency of the pulses Et produced from the timer circuit is decreased. As a consequence, the welding current average value Ia is decreased to shorten the arc length. A similar operation is carried out when the arc length becomes shorter than the predetermined length.

As understood from the foregoing description, the pulse arc welding device according to the first embodiment controls the arc length to the predetermined length by the control of the frequency of the pulse current.

Figure 14:
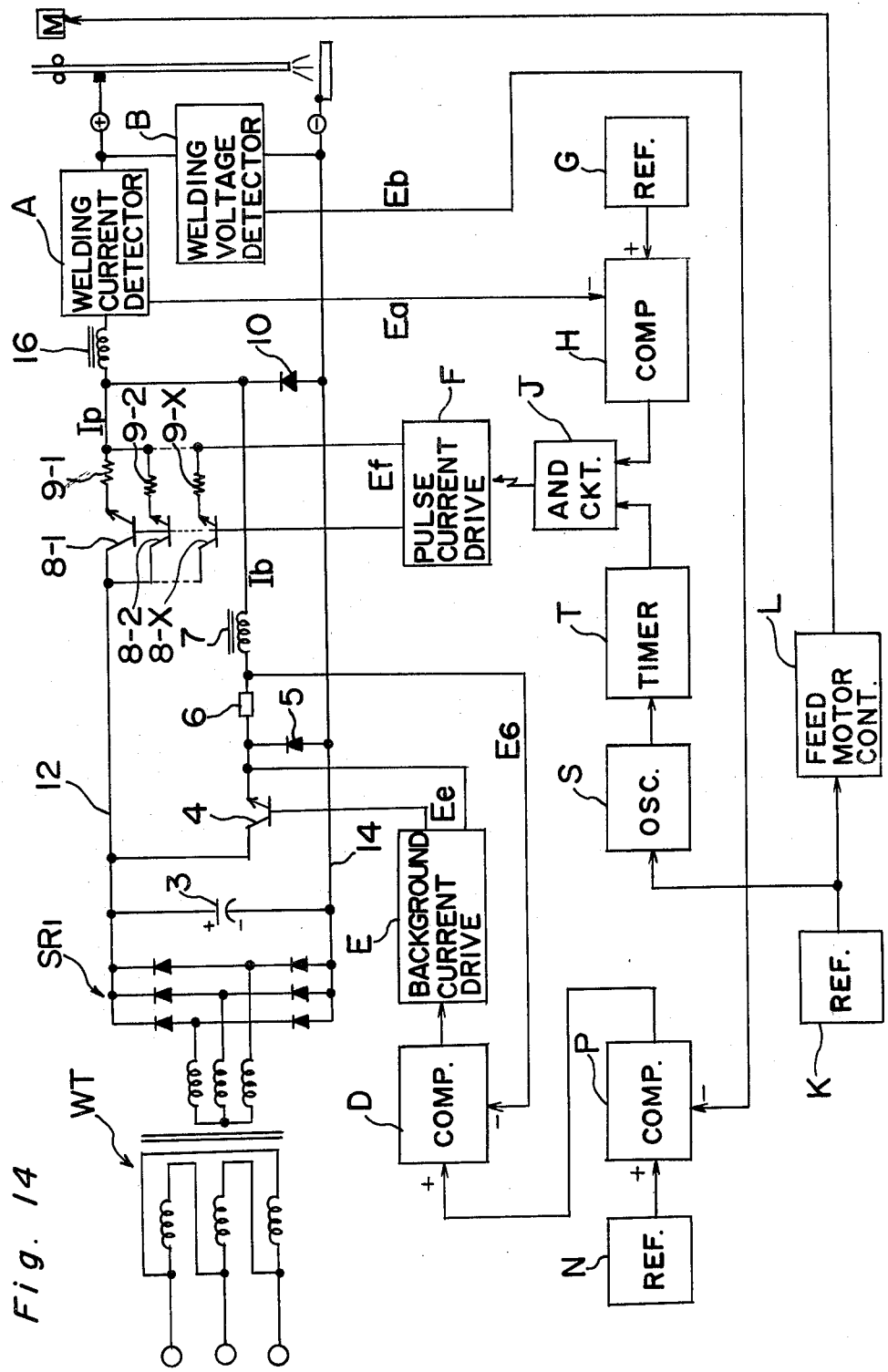
FIG. 14 is a block diagram of a pulse arc welding device according to the second embodiment of the present invention.

Referring to FIG. 14, there is shown a pulse arc welding device according to the second embodiment of the present invention. The welding device of the second embodiment is different from the first embodiment in the following points. Firstly, the reference setting circuit C which has been described as connected to the comparator D is eliminated. Secondly, the output of the comparator P which has been described as connected to the oscillator S is connected to the input of the comparator D. And, thirdly, instead of the comparator P, the oscillator S receives input signal from the reference setting circuit K. According to the second embodiment, the welding power control is formed by a background current control which includes welding voltage detector B, reference circuit N and comparator P. Since the second embodiment is different from the first embodiment in the interconnection between the circuits and since each of the circuits A to T excluding C, Q and R used in the second embodiment are fundamentally identical with those used in the first embodiment, a detail description therefor is omitted for the sake of brevity.

In operation, when the arc length becomes longer than the predetermined length, the voltage Eb produced from the welding voltage detector B increases, and accordingly, the voltage En-Eb produced from the comparator P decreases. Thus, the comparator D and the background current drive circuit E operates in such a manner as to decrease the background current Ib. Accordingly, the welding current average value Ia is decreased so as to shorten the arc length. Similarly, when the arc length becomes shorter than the predetermined length, the background current Ib is increased so as to increase the welding current average value Ia. The welding device of the second embodiment is so arranged as to control the arc length constant by the control of the background current.

According to the second embodiment, the frequency of the pulse current is maintained constant since the oscillator S receives constant voltage from the reference setting circuit K.

Figure 15:
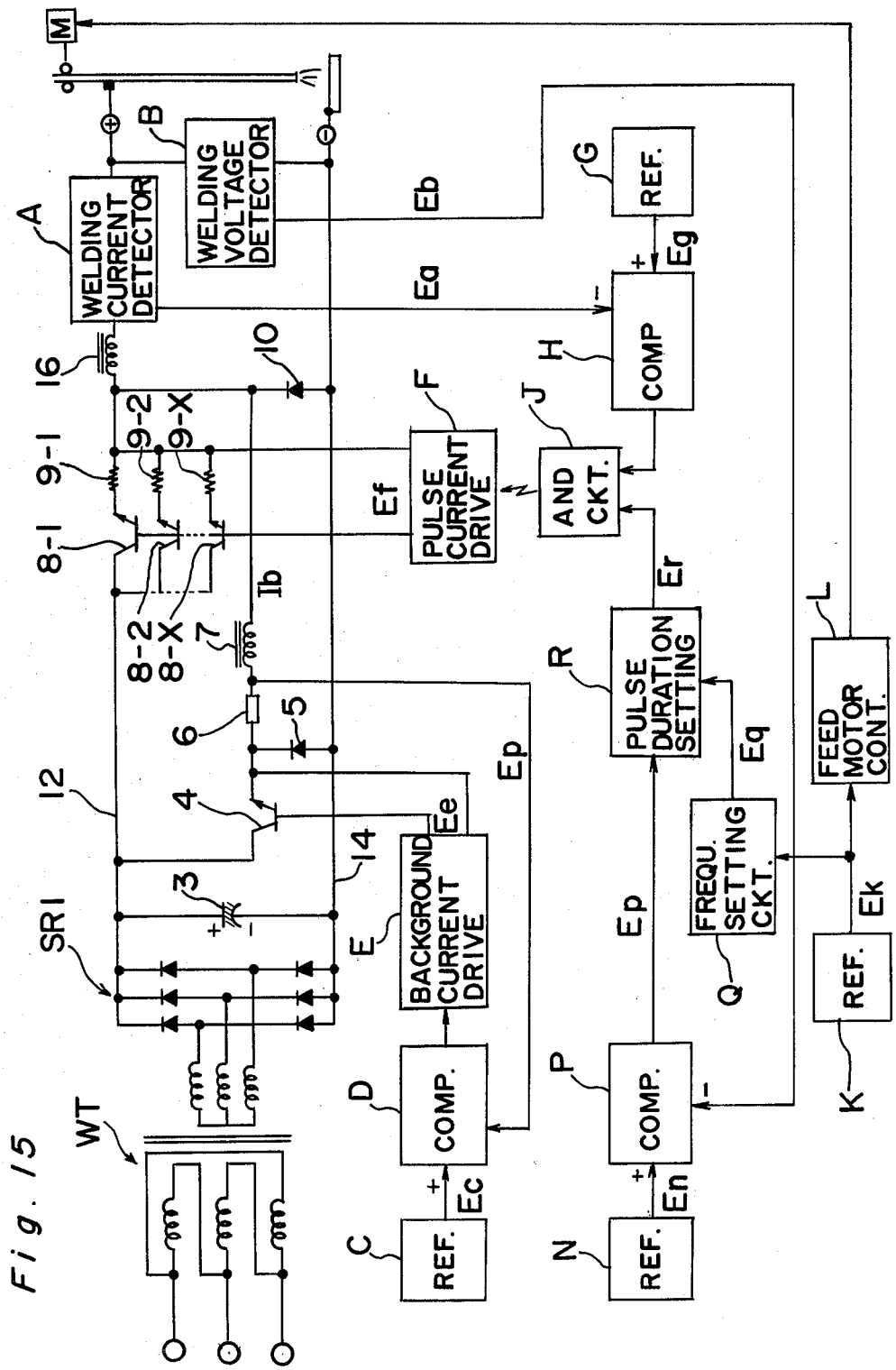
FIG. 15 is a block diagram of a pulse arc welding device according to the third embodiment of the present invention.

Referring to FIG. 15, there is shown a pulse arc welding device according to the third embodiment of the present invention. When compared with the first embodiment, the third embodiment has the welding power control formed by a pulse duration control which includes the welding voltage detector B, reference circuit N and comparator P which are already described above. The pulse duration control further includes a frequency setting circuit Q coupled with the reference circuit K for producing a train of pulses determined by the reference voltage Ek obtained from the reference circuit K and a pulse duration setting circuit R which determines the pulse duration by the signal obtained from the comparator P. The detail of the pulse duration control is described below.

Figure 16:
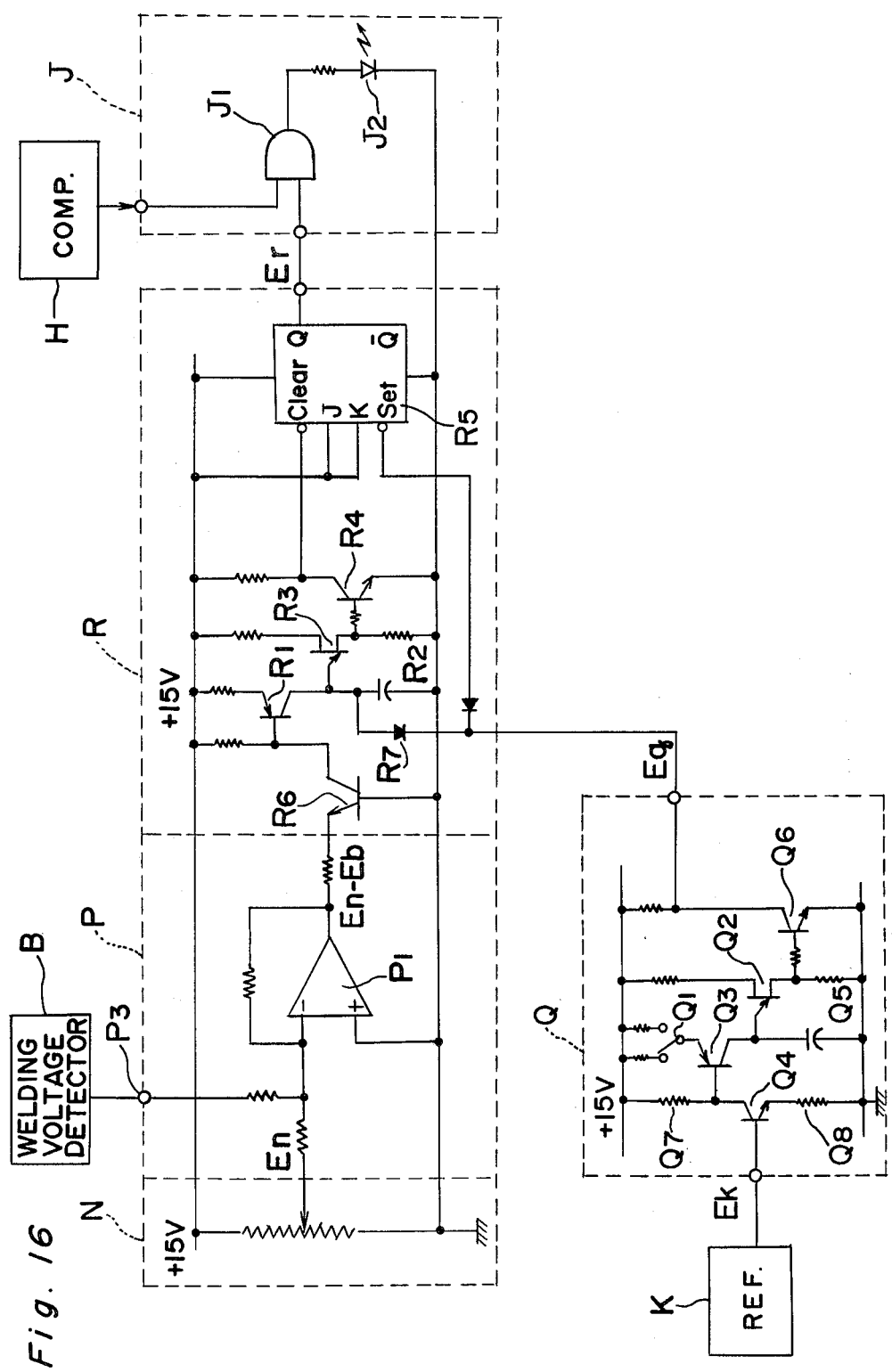
FIG. 16 is a circuit diagram of blocks N, P, Q, R and J shown in FIG. 15.

Referring to FIG. 16, the frequency setting circuit Q includes a transistor Q4, and resistors Q7 and Q8 which are connected in series between a power supplying line and a grounded line. When the base of the transistor Q4 receives the reference voltage Ek from the reference circuit K, a predetermined voltage is produced from the collector of the transistor Q4. The frequency setting circuit Q further includes transistor Q3, capacitor Q5, unijunction transistor Q2 and transistor Q6 which are connected in a similar manner to those provided in the oscillator S described above. The predetermined voltage produced from the collector of the transistor Q4 is applied to the base of the transistor Q3 so that the capacitor Q5 is charged with a predetermined current. According to the preferred embodiment, a switch Q1 is provided for selecting the desired current to be supplied to the capacitor Q5. When the voltage charged across the capacitor Q5 reaches a predetermined level, the unijunction transistor Q2 is actuated to discharge the capacitor Q5, and at the same time, a pulse is applied to the base of the transistor Q6. Accordingly, the waveform of the voltage produced across the capacitor Q5 has a sawtooth waveform as shown in the first row of FIG. 17, and the waveform of the pulse Eq produced from the transistor Q16 is as shown in the second row of FIG. 17. Accordingly, the train of pulses Eq produced from the frequency setting circuit Q has a predetermined frequency determined by the reference voltage Ek, which is also used for determining the feeding speed of the consumable electrode 20.

Figure 17:
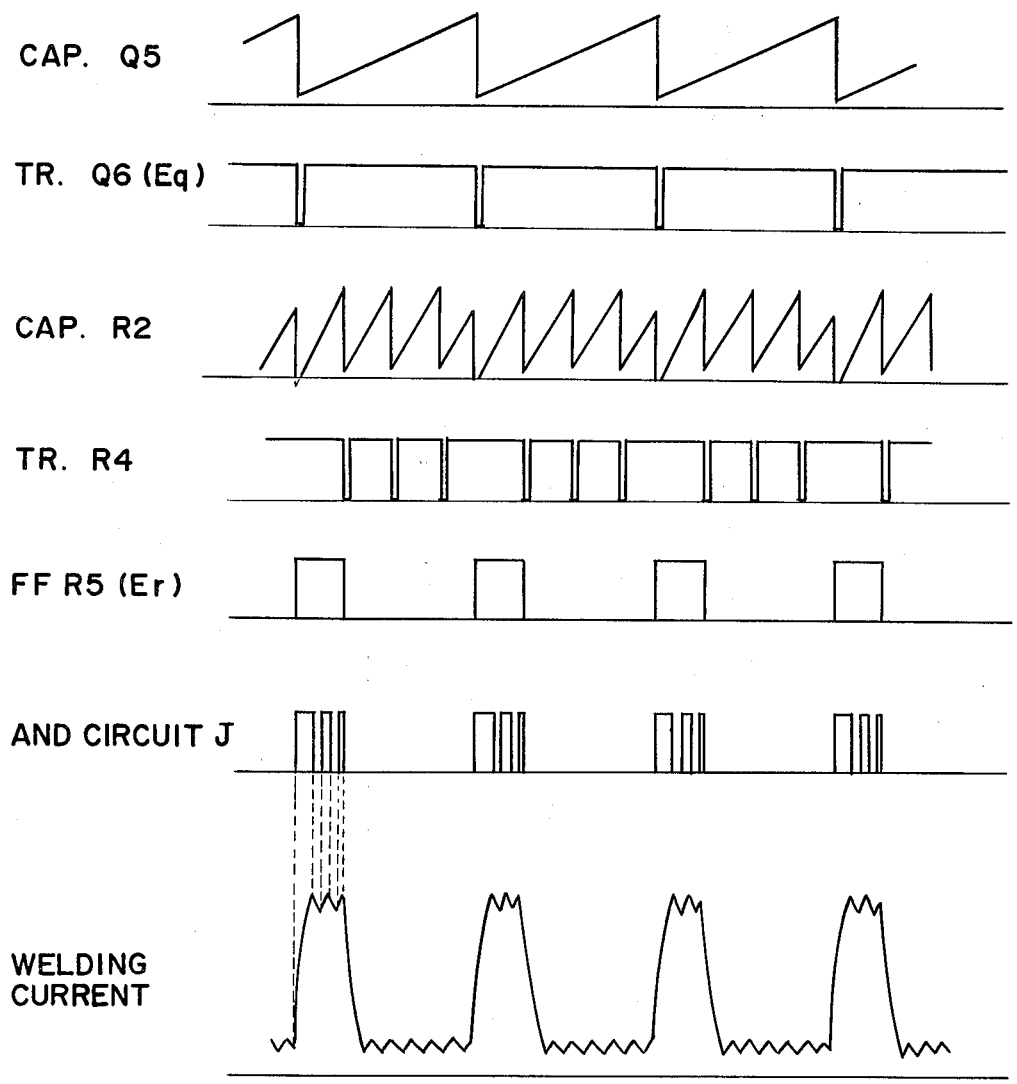
FIG. 17 is a graph showing waveforms obtained from major points in the circuit of FIG. 16.

The train of pulses produced from the frequency setting circuit Q is applied to a set terminal of a flip-flop circuit R5 provided in the pulse duration setting circuit R which includes a base grounded transistor R6 for amplifying the difference voltage En-Eb obtained from the comparator P. The pulse duration setting circuit R further includes transistor R1, capacitor R2, unijunction transistor R3 and transistor R4 which are connected in a similar manner to those described above in the oscillator S or in the frequency setting circuit Q. Accordingly, the transistor R4 produces a train of pulses in which the duration is varied relatively to the change in the difference voltage En-Eb. Since the emitter of the unijunction transistor R3 is connected through a suitable diode R7 to the collector of the transistor Q6, the capacitor R2 is forcibly discharged through the transistor Q6 when a pulse is produced from the unijunction transistor Q2. Therefore, the voltage produced across the capacitor R2 has a waveform as shown in the third row of FIG. 17, and the voltage produced from the collector of the transistor R4 has a waveform as shown in the fourth row of FIG. 17. The pulse signal produced from the collector of the transistor R4 is applied to the clear terminal of the flip-flop circuit R5 so that the flip-flop circuit R5 produces from its terminal Q a duration controlled pulse Er as shown in FIG. 17. In summary, a pulse Eq produced from the frequency setting circuit Q sets the flip-flop R5 to determine the step up of the pulse Er and, at the same time, discharges the capacitor R2 to start the charging of the capacitor R2 from the very beginning by the current determined by the voltage difference En-Eb. Thereafter, when the capacitor R2 is charged to a predetermined level, the unijunction transistor R3 is actuated to produce a pulse from the transistor R4 that resets, or clears, the flip-flop, and accordingly, the pulse Er is stepped down. In other words, the pulse duration of the pulse Er is determined by the current that charges the capacitor R2, which is in turn determined by the voltage difference En-Eb.

The train of pulses Er produced from the pulse duration setting circuit R is applied through the AND circuit J so that the AND circuit J produces a train of pulses as shown in FIG. 17 and thus, the duration of the welding current is controlled.

In operation, when the arc length becomes longer than the predetermined length, the voltage Eb produced from the welding voltage detector B increases, and accordingly, the voltage En-Eb produced from the comparator P decreases. Thus, the voltage impressed on the base of the transistor R1 becomes low to increase the current that charges the capacitor R2. Accordingly, the pulse duration of the pulse Er is decreased so as to decrease the welding current average value Ia.

It is to be noted that when employing the detecting period control circuit U in the pulse arc welding device of the third embodiment, the terminals Ub and inverter U5 are connected to the pulse duration setting circuit R.

Since the consumable electrode feeding speed is approximately in proportional to the welding current, and the welding current is in proportional to the appropriate arc voltage, it is known that the feeding speed is approximately in proportional to appropriate arc voltage. When this relation is taken into consideration, it is possible to use reference circuit K for setting not only the feeding speed but also for setting the reference voltage for the desired welding voltage, in place of the reference circuit N. When this arrangement is employed, since the desired background current and pulse current are determined once the material and diameter of the consumable electrode are determined, a desirable welding condition can be obtained through the control of feeding speed, i.e., welding current.

Although the present invention has been fully described with reference to several preferred embodiments, many modifications and variations thereof will now become apparent to those skilled in the art, and the scope of the present invention is therefore to be limited not by the details of the preferred embodiments described above, but only by the terms of appended claims.

What is claimed is:

1. A method of welding a workpiece by an arc produced between a consumable electrode which is fed towards the workpiece at a constant speed and the workpiece, said arc being produced by a pulse current imposed on a background current, said method comprising the steps of:
   generating a background current with a constant current characteristic;
   generating a pulse current with a constant current characteristic;
   controlling the pulse current level to a predetermined level;
   imposing the pulse current on the background current;
   detecting the welding voltage measured between the consumable electrode and the workpiece for producing a welding voltage signal;
   producing a reference signal indicative of a desired welding voltage;
   comparing the welding voltage signal with the reference signal for producing a difference signal indicative of the difference therebetween; and
   controlling an average value of the welding current by said difference signal such that the average value of the welding current is decreased relative to the increase of said welding voltage signal above a predetermined level, and the average value of the welding current is increased relative to the decrease of said welding voltage signal below said predetermined level, whereby said selding voltage which is in relation to the arc length is maintained constant.

2. A method for welding as claimed in claim 1, wherein said step of controlling controls the background current level.

3. A method for welding as claimed in claim 1, wherein said step of controlling controls the frequency of said pulse current.

4. A method for welding as claimed in claim 1, wherein said step of controlling controls the pulse duration of said pulse current.

5. A method for welding as claimed in claim 1, wherein said step of detecting detects the welding voltage as a function of an average current of background current and pulse current.

6. A method for welding as claimed in claim 1, wherein said step of detecting detects the welding voltage as a function of an average current of background current only.

7. A method for welding as claimed in claim 1, wherein said step of detecting detects the welding voltage as a function of an average current of pulse current only.

8. A pulse arc welding device for welding a workpiece by an arc produced between a consumable electrode which is fed towards the workpiece at a constant speed and the workpiece, said arc being produced by a pulse current imposed on a background current, said welding device comprising:
   means for generating a background current with a constant current characteristic;
   means for generating a pulse current with a constant current characteristic;
   means for controlling a pulse current level to a predetermined level;

means for imposing the pulse current on the background current;

means for detecting the welding voltage measured between the consumable electrode and the workpiece for producing a welding voltage signal;

first reference producing means for producing a first reference signal indicative of a desired welding voltage;

first comparing means for comparing the welding voltage signal with the first reference signal for producing a first difference signal indicative of the difference therebetween; and means for controlling an average value of the welding current by said first difference signal such that the average value of the welding current is decreased relative to the increase of said welding voltage signal above a predetermined level, and the average value of the welding current is increased relative to the decrease of said welding voltage signal below said predetermined level, whereby said welding voltage which is in relation to the arc length is maintained constant.

9. A pulse arc welding device as claimed in claim 8, wherein said controlling means is coupled with said background current generating means for controlling the background current.

10. A pulse arc welding device as claimed in claim 9, wherein said background current generating means comprises:

means for driving said background current;

means for detecting the background current level;

second comparing means for comparing the detected background current level with the first difference signal and for producing a second difference signal, said second difference signal being applied to said background current driving means for increasing and decreasing the background current level when said welding voltage is decreased and increased, respectively, with respect to said predetermined level.

11. A pulse arc welding device as claimed in claim 8, wherein said controlling means is coupled with said pulse current generating means for controlling the pulse current.

12. A pulse arc welding device as claimed in claim 11, wherein said pulse current generating means comprises:

a first oscillator coupled with said first comparing means for producing a first pulsating signal having a frequency determined by said first difference signal;

a timer coupled with said first oscillator for producing said first pulsating signal with a predetermined pulse duration; and means provided operatively in association with said timer for driving said pulse current, whereby the frequency of said first pulsating signal increases and decreases when said welding voltage is decreased and increased, respectively, with respect to said predetermined level.

13. A pulse arc welding device as claimed in claim 11, wherein said pulse current generating means comprises:

a second oscillator for producing a second pulsating signal having a predetermined frequency;

a pulse duration setting means coupled with said first comparing means for setting the pulse duration relatively to said first difference signal for the second pulsating signal; and means provided operatively in association with said pulse duration setting means for driving said pulse current, whereby the pulse duration of the second pulsating signal is increased and decreased when said welding voltage is decreased and increased, respectively.

14. A pulse arc welding device as claimed in claim 8, wherein said welding voltage detecting means comprises means for detecting a period when the pulse current is present, and means for detecting the welding voltage as a function of an average current of pulse current.

15. A pulse arc welding device as claimed in claim 8, wherein said welding voltage detecting means comprises means for detecting a period when only the background current is present, and means for detecting the welding voltage as a function of an average current of background current.

16. A pulse arc welding device as claimed in claim 8, wherein said welding voltage detecting means comprises means for detecting the period when pulse current and only background current are present, and means for detecting the welding voltage as a function of an average current of background and pulse currents.

17. A pulse arc welding device as claimed in claim 8, wherein said welding voltage detecting means comprises means for detecting a period when the pulse current is present, means for detecting a period when only the background current is present, means for detecting the period when pulse current and only background current are present, and means for selecting one said three period detecting means for respectively detecting the welding voltage as a function of one of an average current of pulse current, an average current of background current and an average current of background and pulse currents.

* * * * *